(12) United States Patent
Mietschnig et al.

(10) Patent No.: US 12,007,311 B2
(45) Date of Patent: Jun. 11, 2024

(54) SYSTEM FOR MONITORING WIND INFLUENCES ON A WORKING MACHINE

(71) Applicant: LIEBHERR-WERK NENZING GMBH, Nenzing (AT)

(72) Inventors: Walter Mietschnig, Brand (AT); Patrick Jussel, Ludesch (AT)

(73) Assignee: LIEBHERR-WERK NENZING GMBH, Nenzing (AT)

( * ) Notice: Subject to any disclaimer, the term of this patent is extended or adjusted under 35 U.S.C. 154(b) by 0 days.

(21) Appl. No.: 17/387,886

(22) Filed: Jul. 28, 2021

(65) Prior Publication Data
US 2022/0034757 A1 Feb. 3, 2022

(30) Foreign Application Priority Data

Jul. 29, 2020 (DE) ...................... 10 2020 119 969.4

(51) Int. Cl.
G01M 99/00 (2011.01)
G01P 5/02 (2006.01)

(52) U.S. Cl.
CPC ............. G01M 99/005 (2013.01); G01P 5/02 (2013.01)

(58) Field of Classification Search
CPC ......... B66C 13/18; B66C 15/00; B66C 15/04; B66C 15/06; B66C 23/00; G01M 99/005; G01P 5/02; G07C 5/008
See application file for complete search history.

(56) References Cited

U.S. PATENT DOCUMENTS

| | | | |
|---|---|---|---|
| 5,361,633 A * | 11/1994 | Peet, II .................. | G01P 13/02 73/861.85 |
| 9,540,217 B2 * | 1/2017 | Härkönen ............... | G01D 3/08 |
| 2015/0375971 A1 | 12/2015 | Henkel et al. | |
| 2017/0107090 A1 | 4/2017 | Mondal et al. | |
| 2018/0284788 A1 * | 10/2018 | Remboski ............. | G01L 19/086 |

FOREIGN PATENT DOCUMENTS

| CN | 101526412 A | 9/2009 | |
|---|---|---|---|
| CN | 110255381 A | 9/2019 | |
| DE | 202013003782 U1 | 5/2013 | |
| EP | 1221426 A2 | 7/2002 | |
| KR | 101937085 B1 * | 2/2018 | ........... G08B 27/001 |

OTHER PUBLICATIONS

English translation of KR-101937085-B1 (Donghan) (Year: 2018).*
Delaney, K., "Ambient Intelligence with Microsystems," Microsystems (Series), Springer, Boston, MA, 2008, 419 pages.

* cited by examiner

Primary Examiner — Giovanni Astacio-Oquendo
Assistant Examiner — Martin Walter Braunlich
(74) Attorney, Agent, or Firm — McCoy Russell LLP (57) ABSTRACT

The disclosure relates to a system for monitoring wind influences on a working machine, such as a mobile crane or crawler crane, comprising at least one detection unit that is arranged on the working machine and by means of which a current wind speed can be detected, a recording unit that is configured to receive, to store, and to transmit data of the detection unit during and outside the operation of the working machine, a controller of the working machine that is configured to determine a current working machine state, an external processing unit that is configured to directly or indirectly receive and process data from the detection unit relating to an current wind speed and data from the controller, and an output device that is configured to receive data from the external processing unit.

19 Claims, 4 Drawing Sheets

SYSTEM FOR MONITORING WIND INFLUENCES ON A WORKING MACHINE

CROSS REFERENCE TO RELATED APPLICATION

The present application claims priority to German Patent Application No. 10 2020 119 969.4 filed on Jul. 29, 2020. The entire contents of the above-listed application is hereby incorporated by reference for all purposes.

TECHNICAL FIELD

The present invention relates to a system for monitoring wind influences on a working machine having a detection unit, a recording unit, a controller, an external processing unit, and an output unit, as well as to a working machine having a detection unit, a recording unit, and a controller of such a system.

BACKGROUND AND SUMMARY

A number of working machines such as mobile cranes and specifically crawler cranes are exposed to substantial wind influences in and out of operation that can result in a loss of stability of the working machine or in machine breakage on an exceeding of the maximum permitted wind speeds. The influence of wind and its monitoring are therefore of very great relevance for safety and in particular represent a great source of danger when the working machine is out of operation.

With mobile cranes, the respective maximum wind speeds for the modes "crane in operation" and "crane out of operation" are typically defined in the corresponding technical documentation (operating instructions, payload tables, etc.). In operation, a real time monitoring of the wind speeds currently attacking the crane typically takes place (i.e. measuring the current wind speeds and warning on an exceeding of a permitted value). Out of operation, the working machine is, however, normally switched off and not monitored. The crane operator therefore has to take the maximum permitted wind speed, that typically also depends on the crane configuration (in particular on the boom lengths used) and on the geometrical crane position (crane erected, crane placed down, crane partially placed down or jack knife position) from the technical documentation, compare it with a weather forecast relevant to the crane location, and take measures accordingly. Since the weather conditions, in particular the wind speeds and gust speeds to be expected, can practically not always be locally predicted completely or exactly, crane accidents continuously occur due to an exceeding of the maximum permitted wind speeds applicable to the crane figuration out of operation.

It is therefore the underlying object of the present invention to provide a monitoring system for a working machine that ensures sufficient safety with respect to wind influences both in operation and out of operation.

This object is achieved in accordance with the invention by a monitoring system having the features of claim 1. A system for monitoring wind influences on a working machine, in particular a mobile crane or crawler crane, is accordingly proposed that comprises the following:

at least one detection unit that is arranged on the working machine and by means of which a current wind speed can be detected;

a recording unit that is configured to receive, to store, and to transmit data of the at least one detection unit during and outside the operation of the working machine;

a controller of the working machine that is configured to determine a current working machine state, an external processing unit that is configured to receive and to process data from the detection unit relating to the current wind speed and data from the controller directly or indirectly and in particular wirelessly; and an output device that is configured to receive data from the external processing unit, in particular wirelessly.

The controller and/or the external processing unit is/are configured in accordance with the invention to determine, for example to calculate or to read, a limit value for a wind speed in dependence on the current working machine state. I.e. provision can be made that the controller receives data from which it calculates the limit value on site and transmits it to the external processing unit. Provision can alternatively or additionally be made that the controller only receives the data required for the calculation or determination of the limit value and transmits them on to the external processing unit where the calculation of the limit value then takes place. The determination of a current working machine state preferably comprises the processing of sensor data.

The output device is configured in accordance with the invention to output a warning on a reaching and/or exceeding and/or impending reaching of the limit value by the current wind speed.

The monitoring system in accordance with the invention enables a permanent, i.e. round the clock monitoring of the wind influences on the working machine independently of whether it is in operation or switched on or not. These wind data can be continuously recorded and provided to the external processing unit by the provision of a recording unit that is able also to receive and to store or to log wind data from the at least one detection unit outside the operation of the working machine. Said processing unit analyzes or processes the continuously recorded wind data and compares them with limit values for the current crane configuration provided by the controller of the working machine and with other parameters such as the position and current state or working machine state.

The limit values here do not have to be provided round the clock, i.e. also outside operation, by the controller as with the current wind speeds measured by the detection unit. If the working machine is out of operation and if the controller therefore no longer transmits any current data to the external processing unit, the external processing unit can make use of the last limit values transmitted during operation since the state and position of the working machine do not change after deactivation. Due to the permanent storage and provision of current wind data by the recording unit, these values can be compared round the clock with the available limit values and a warning can be output to the operator of the working machine by the output device as required.

A significant increase in safety is thereby achieved. On an impending exceeding/reaching of the fixed limit values by the current wind conditions, a timely warning of the operator can also take place out of operation and corresponding measures can be taken.

The fact that the external processing unit is configured to directly or indirectly receive data from the detection unit relating to the current wind speed includes the cases, first, that the detection unit has its own transmission unit and transmits the wind speed data directly to the external processing unit, or, second, that the recording unit transmits the wind speed data to the external processing unit. Both options can likewise be simultaneously implemented.

Advantageous embodiments of the invention result from the dependent claims and from the following description.

The external processing device can be a server, a computer network, or a cloud. It is in particular connected to a transmission unit that is able to receive signals or data from the working machine and to transmit data to the output device. This preferably takes place wirelessly. The output device can be a PC/notebook, a tablet PC, a smartphone, or a display in the operator's cabin of the working machine. The warning is preferably transmitted wirelessly to the output device, for example by SMS, email, push notification, as a notification or display in an app, or the like. The warning can take place optically and/or acoustically. Provision can further be made that a current wind direction is detectable by means of the at least one detection unit or that at least one detection unit is provided that is separately configured for the measurement of the wind direction.

A plurality of detection units are preferably provided that detect the current wind speed and, optionally, the wind direction and/or other wind-related parameters at different positions of the working machine and that transmit the data to the recording unit. The working machine can, for example, be a mobile crane having a boom and a needle boom, with a respective at least one detection unit being arranged both at the boom and at the needle boom. Due to a larger number of detection units distributed over the working machine, the circumstance can better be taken into account that different components/sites of the working machine oppose the wind with a differently large resistance and that the wind speed and the wind direction can differ from one another at different sites of the working machine.

An energy source is provided in an embodiment by means of which the recording unit is also suppliable with energy with a working machine out of operation and which is preferably arranged at the working machine. It is ensured by the energy source that a recording of the values delivered by the detection unit can take place round the clock and independently of the energy supply provided in the operation of the working machine. Alternatively, the recording unit can be detached outside the working machine and can receive the signals of the at least one detection unit wirelessly. Provision can further be made that at least one detection unit is supplied with energy/power from the same energy source.

The energy source preferably comprises a battery/rechargeable battery, for example a crane battery, a battery/rechargeable battery separately assigned to the recording unit, and/or an energy converter, in particular a solar cell.

Provision is made in a further embodiment that the output device is configured to present, in particular to graphically present or to visualize, data relating to a current wind speed and/or to the limit value and/or to a weather forecast and/or to a current working machine state and/or to the current configuration of the working machine. Useful data or actual data and/or desired data can thereby be displayed to the operator of the working machine during operation. These data are in particular provided to the output device via the external processing unit.

Provision is made in a further embodiment that the external processing unit is configured to determine with reference to the transmission of the data by the controller, in particular with reference to transmission intervals, that the working machine is out of operation and to continue to receive data from the recording unit relating to a current wind speed. The data from the controller are received at specific and preferably fixable time intervals. If a transmission no longer takes place due to a transition of the working machine into the setting "out of operation", this is registered by the external processing unit and it is thereby recognized that the working machine is switched off. The transmission of the data logged by the recording unit relating to the current wind conditions in contrast continues to transmit to the external processing unit and in particular likewise at settable intervals that can be synchronous or asynchronous to the transmission intervals of the controller.

Provision is made in a further embodiment that the external processing unit is configured to compare the data received from the recording unit relating to the current wind speed and the data received by the controller relating to the limit value with one another, with the external processing unit further being configured to use a limit value last received by the controller in operation in a time period in which the working machine is out of operation and therefore no transmission of data takes place for the comparison.

Provision is made in a further embodiment that the external processing unit is further configured to receive data from the controller relating to a current position of the working machine and/or to a current working machine state and/or to the current configuration of the working machine and/or to the payload values or payload table data of the working machine and/or to limit values for wind speeds in dependence on the working machine state. Alternatively or additionally, the external processing unit can be configured to receive data from an external service relating to a weather forecast. The weather forecast in particular relates to the whereabouts of the working machine and covers at least the time period in which the working machine is out of operation.

The alignment or state of the working machine and of the different components (e.g. the angle position of a boom) is in particular understood as the working machine state. The working machine can thus be moved, when the spatial conditions at the deployment site permit, into a setting "out of operation" in which, for example, a boom of the working machine is placed down/supported on the ground. Every position or every working machine state thus provides a different attack surface for wind and is thus to be taken into account for the determination of the corresponding limit values. Possible settings or states can, for example, with a mobile crane having a boom, be a work position (state of the boom within or outside a payload curve range), a parked position (e.g. boom is upright or boom completely placed on the ground) or a jack knife position (boom is partially placed on the ground or its tip is supported on the ground).

In contrast, in particular the equipment or the assembly state of the working machine (e.g. with a mobile crane as the working machine: setup of the crane, i.e. configuration of the boom (main boom with or without needle boom/folding tip, etc.), length of the boom part pieces, use of a derrick boom, ballast, height or position of the at least one detection unit, etc.) is understood as the working machine configuration, i.e. the geometrical relationships, arrangement, etc. of the different components. The configuration is typically not changed during use and can be stored in a database or in a memory of the working machine.

The limit values for wind speeds calculated by the controller or read from a database in particular apply to the respective state (work position, parked position, jack knife position, etc. and exact position of the boom and/or other components) and the respective configuration of the working machine.

Provision is made in a further embodiment that at least one sensor is provided at the working machine by means of which a parameter of the current working machine state is detectable, with the controller being configured to receive data from the at least one sensor, for example via the controller. The sensors in total in particular detect the current state and optionally also the current configuration of the working machine. The limit values for the wind speed(s) that apply to the current configuration or state of the working machine can be calculated from the sensor data. This can take place locally on the working machine by the controller or also by the external processing unit after the corresponding data have been transmitted by the controller.

Provision is made in a further embodiment that at least one transmission unit or telematic unit is provided at the working machine that is configured to transmit data from the controller and/or from the recording unit wirelessly to the external processing unit. One respective transmission unit for the data of the recording unit and one transmission unit for the data of the controller are preferably provided that transmit to the external processing unit independently of one another. The transmission unit associated with the controller in particular only transmits data to the external processing unit when the working machine is in ongoing operation (i.e. the controller and the engine are switched on). In contrast, the transmission unit associated with the recording unit also transmits data to the external processing unit, in particular at settable intervals, outside of operation or with a deactivated working machine. This can take place, for example, by GSM or also by another wireless technology. The transmission unit associated with the recording unit can be part of the recording unit.

Provision is made in a further embodiment that the controller is configured to receive the data from the at least one detection unit and preferably to present data relating to the current wind speed and/or to the limit value on a display unit of the working machine. Not only a transmission of data of the controller to the external processor unit therefore takes place in ongoing operation of the working machine, but information is rather also displayed to the operator of the working machine directly and in real time. The controller here advantageously also receives data from the at least one detection unit and/or from the recording unit relating to the current wind situation such as a current wind speed. In addition to a monitoring of the wind situation at the working machine that is out of operation by the external processing unit, a monitoring can thereby also take place in ongoing operation by the controller and a corresponding display of the values and/or a warning to the operator on a reaching or an impending reaching of limit values.

Provision is made in a further embodiment that data relating to the current configuration of the working machine and/or payload values and/or limit values for wind speeds in dependence on the working machine state and/or on the working machine configuration are stored in the controller or in a memory (or a database) readable by the controller. These data can be fully or partially transmitted to the external processing unit and/or directly locally processed and evaluated by the controller.

Provision is made in a further embodiment that a position detection unit, in particular a GPS module, arranged at the working machine for the detection of the current position of the working machine is provided, with the controller being configured to receive position related data from the position detection unit. The position data can be locally processed by the controller and/or can be transmitted to the external processing unit. The external processing unit can, for example, include a location-specific weather forecast in the monitoring using the detected current position of the working machine.

Provision is made in a further embodiment that the at least one detection unit is an anemometer, in particular a cup anemometer, and is preferably arranged at a boom of the working machine.

Provision is made in a further embodiment that the at least one detection unit works without an energy supply and has a signal generation means for generating a signal, in particular a reed switch, with the recording unit being configured to receive this signal. The detection unit can, for example, be configured as a cup anemometer that switches one or more reed contacts. Only a magnetic field is required for this purpose, for example generated by one or more magnets (in particular permanent magnets) arranged at the cup anemometer or at a component moved thereby, said magnetic field switching the reed contact and enabling a current flow on approaching (here: wind induced rotation) the reed contact. In this case, the detection unit does not have to have a separate energy source, whereas the voltage/energy for the reed contact/reed switch is preferably produced by the energy source of the recording unit.

The detection unit can have to outputs, in particular digital outputs: one output for the controller for the monitoring and/or presentation of the current wind speed(s) for the operator of the working machine and one output for the recording unit for the continuously carried out registration/recording of the current wind speed(s). The recording unit can be a low energy device, for example a low energy data logger, that can obtain and store/record the detected wind speed data with a minimal power takeup round the clock. The controller can be a control unit, e.g. a crane controller, by means of which different components of the working machine or the working machine per se are/is controllable.

The present invention further relates to a working machine, in particular a crawler crane or a mobile crane, having at least one detection unit, a recording unit, and a controller of a system in accordance with the invention. In this respect, the same advantages and properties obviously result as for the system in accordance with the invention so that a repeat description will be dispensed with. The working machine can preferably additionally have an energy source and/or at least one sensor and/or at least one transmission unit and/or a memory/a database and/or a position detection unit as described above. The working machine can also have an output device, for example in the form of an operator display.

BRIEF DESCRIPTION OF THE FIGURES

Further features, details, and advantages of the invention result from the embodiments explained in the following with reference to the Figures. There are shown.

DETAILED DESCRIPTION

Figure 1:
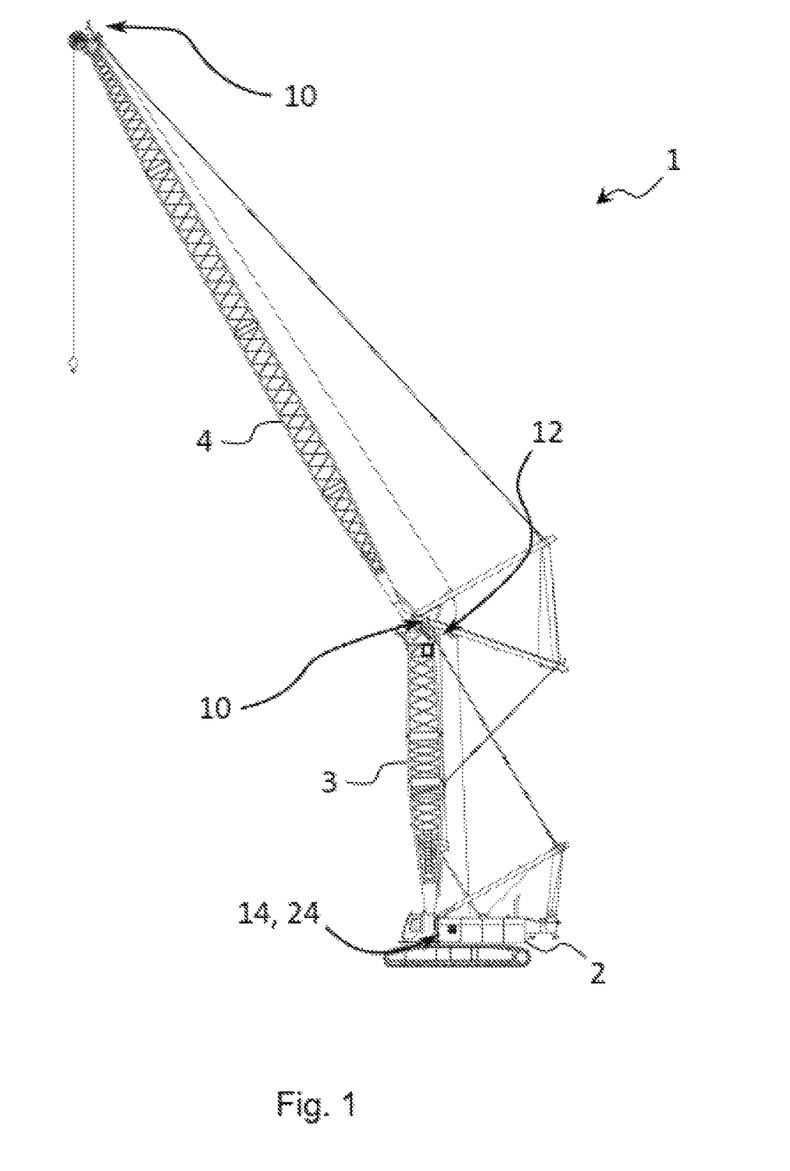
FIG. 1: a side view of a crawler crane with components of the system in accordance with the invention in accordance with a first embodiment.

A crawler crane 1 is shown in FIG. 1 as an example for a working machine having components of the monitoring system in accordance with the invention in a side view. A working machine in the sense of the present invention can, however, also be any other working machine that is exposed to wind influences and requires a corresponding monitoring.

Figure 2:
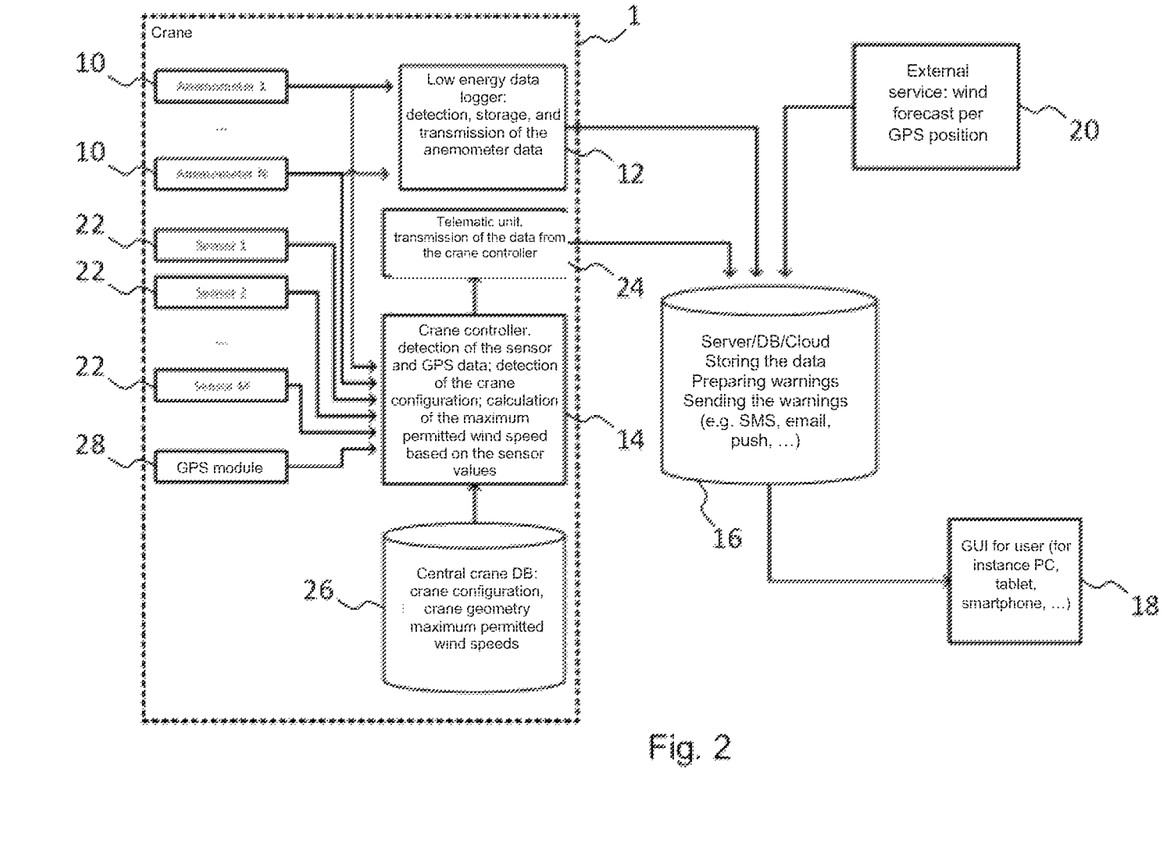
FIG. 2: a schematic representation of the components of the system in accordance with the invention and their connections in accordance with a first embodiment.

A first embodiment of the system in accordance with the invention is shown schematically in FIG. 2.

The crane 1 has a superstructure 2 rotatably supported on an undercarriage and having a boom 3 pivotably connected thereto in an articulated manner and a needle boom 4 mounted thereto. Both the boom 3 and the needle boom 4 offer a large area of attack to wind so that a monitoring of the current wind conditions is necessary to prevent an accident or a tilting over. For this purpose, the crane 1 respectively has a detection unit (anemometer) 10 designed as a rotatably supported cup anemometer at the tip of the boom 3 and at the tip of the needle boom 4. The detection unit (anemometer) 10 may be referred to herein as anemometer 10, or, plurally as detection units (anemometers) 10 or, simply, anemometers 10.

A crane controller 14 receives the data of the anemometers 10 (wind sensors) that relate to the current wind strength at corresponding positions and processes them for the purpose of a wind monitoring. For this purpose, the controller 14 has access to a database 26 of the crane 1 in which inter alia information with respect to the current crane configuration and further data such as payload values or limit values for wind speeds in dependence on the crane state and/or the crane configuration are stored. The current crane state (boom angle, needle boom angle, etc.) is detected by a series of sensors 22 (not shown) and provided to the controller 14. The controller 14 calculates from this information limit values for the maximum permitted wind speeds at the positions of the anemometers 10 or reads corresponding values from a memory.

The limit values are transmitted, optionally together with the wind data delivered by the detection units (anemometers) 10 and optionally together with position data of the crane 1 provided by a GPS module 28, to an external processing unit 16, for example, a cloud, by means of a transmission unit or telematics 24. It can include further information such as weather forecast data of an external supplier or external service 20 and can analyze the data provided. On an impending exceeding or on a reaching of the limit values by the measured current wind speed, a warning can be output via an output device 18, for example, an operator display in an operator's cabin of the crane 1, a smartphone, a PC a tablet, or the like to warn the operator. The latter can then initiate suitable measures such as placing the boom 3, 4 down on the ground.

A transmission of the data from the controller 14 to the external processing unit 16, however, only takes place in ongoing operation of the crane 1 when the controller 14 and the engine are activated. In machines of the category, it was therefore necessary on the positioning of the crane in a position "out of operation" to rely on the weather forecast data applicable at this time and had no possibility of also monitoring the wind conditions outside of operation and of taking suitable measures as required. This represented a substantial safety risk and led to accidents again and again.

To solve this problem, a recording unit 12 is provided in accordance with the invention at the crane 1 and is a low energy data logger in the present embodiment. The data logger 12 likewise receives the data of the anemometers 10 and stores them in a memory. The data logger 12 has its own energy source, for example the crane battery or a separately assigned battery, optionally also a solar cell or the like, to also be continuously functional outside the operation of the working machine 1 and to be able to record wind data. A separate transmission unit or telematics 24 (for example a separate modem) is associated with the data logger 12 to be able to transmit the recorded current wind data of the anemometers 10 to the external processing unit 16 independently of the operating status of the working machine 1 or of the controller 14. The transmission of the data here takes place at fixable time intervals.

A monitoring of the wind conditions by the external processing unit 16 is thus possible at any time, even when the crane 1 has been switched off. The limit values last provided by the controller 14 prior to the switching off of the crane 1 are used for the comparison with the current wind data. A warning can therefore also be output via the output device 18 even with a deactivated crane when the current wind speeds delivered by the data logger 12 exceed or threaten to exceed a limit value.

Figure 3:
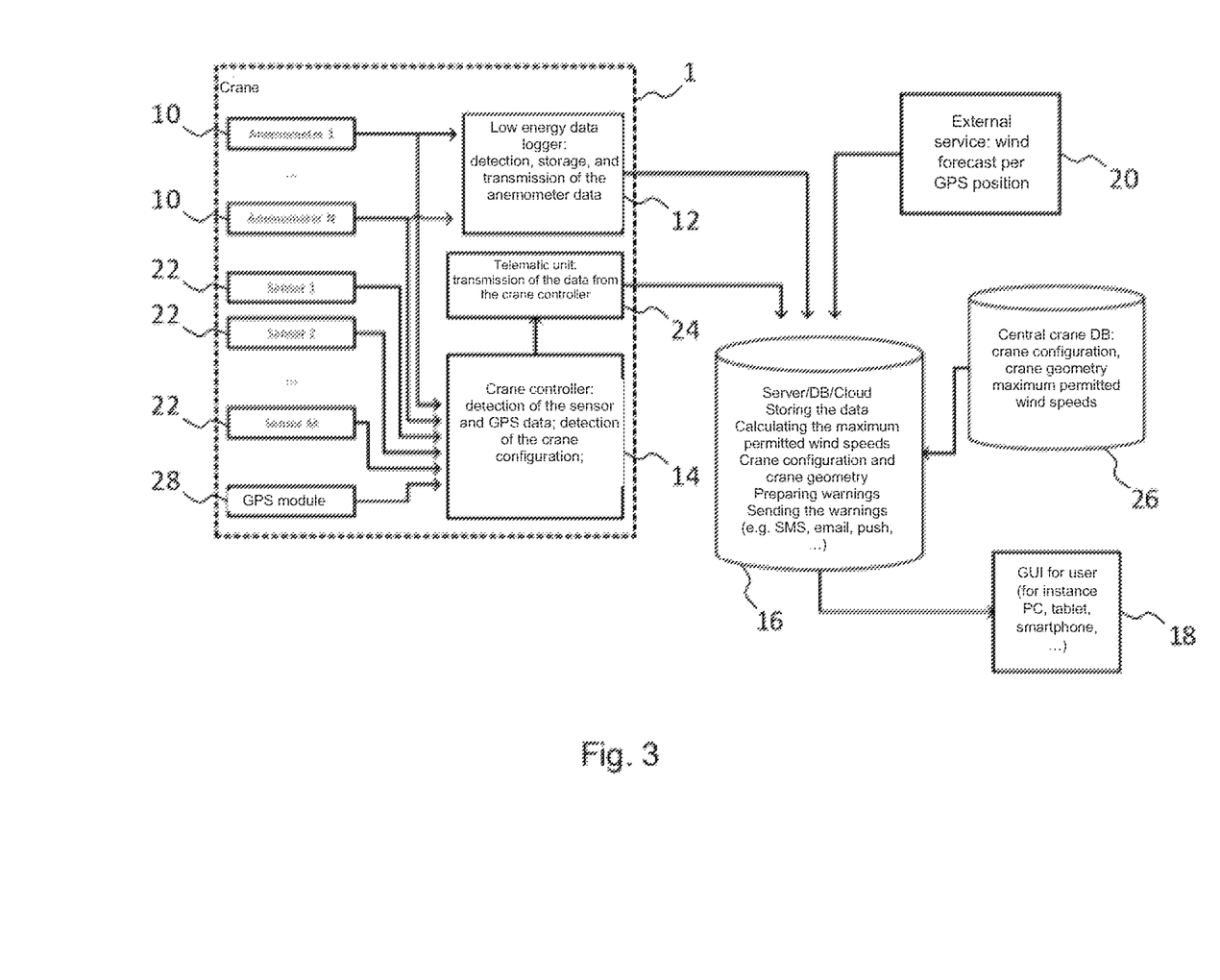
FIG. 3: a schematic representation of the components of the system in accordance with the invention and their connections in accordance with a second embodiment.

A second embodiment of the system in accordance with the invention is shown schematically in FIG. 3. Unlike the system in accordance with FIG. 2, the calculation of the limit values for the maximum permitted wind speeds does not take place locally by the controller 14 here, but rather by the external processing unit 16. The controller 14 therefore transmits the data of the sensors 22 and of the GPS module 28 via the telematics 24 of the crane 1 to the external processing unit 16 that additionally has access to the central database 26 having information with respect to the current crane configuration. This is not arranged locally at the crane 1 in this embodiment.

Figure 4:
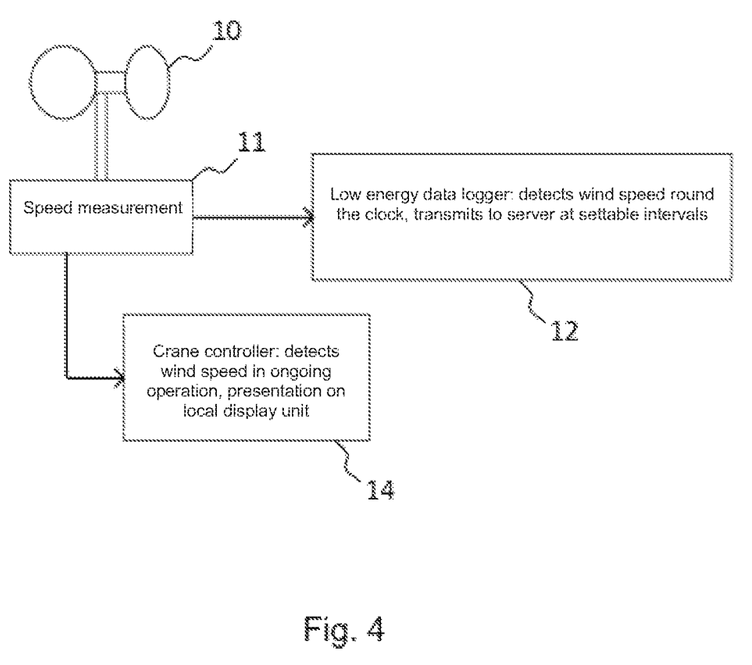
FIG. 4: a schematic representation of the detection unit and its connections with other components of the system in accordance with the invention in accordance with an embodiment.

One of the anemometers 10, a measurement device 11 connected thereto, and the data connections to the data logger 12 and to the controller 14 in accordance with an embodiment are shown schematically in FIG. 4. The anemometer 10 itself does not require its own power supply, but rather switches one or more reed contacts during the wind-induced rotation, whereby signals (e.g. voltage pulses) that represent the current wind speed (in particular a number of revolutions per time unit or speed) are generated and transmitted to the data logger 12. Different detection units or anemometers 10 or a combination of different detection units or anemometers 10 can naturally be used that provide information relating to one or more wind speeds currently occurring (at different points) to the data logger 12.

In summary, the system in accordance with the invention has the following components in accordance with the embodiment shown here:

A plurality of cup anemometers 10 that have an output (for example a digital output) via which the controller 14 can detect the wind speed in the ongoing operation of the working machine 1 to present it to the operator on an operator display in the operator's cabin.

A low energy data logger 12 that can detect the wind speed at a minimal power takeup round the clock and can transmit it to the external processing unit 16 at settable intervals. This low energy data logger 12 can detect the wind speed by means of the cup anemometers 10, for instance via additional reed switches. An addition voltage supply of the anemometers 10 is not necessary due to such reed switches. The wind drives the anemometers 10 and the rotating cups switch the reed contact. The anemometers 10 therefore have two outputs, one each for the controller 14 for the presentation and one for the low energy data logger 12 for the detection of the wind speed round the clock (cf. FIG. 3).

A controller 14 that, in dependence on the crane configuration (e.g. boom lengths used) and on the geometrical crane position (crane 1 out of operation: crane 1 erected in the parked position, crane 1 erected outside the parked position, crane 1 partially placed down (=jack knife position, crane 1 placed down; crane 1 in operation: crane 1 within the payload curve range, crane 1 outside the payload curve range), calculates the limit values (maximum permitted speed). The maximum permitted wind speeds are transmitted to the external processing unit 16 at regular intervals by means of a further telematic unit 24. These transmissions, however, only take place in the ongoing operation of the working machine 1.

A decentral server or an external processing unit 16 that compares the wind speeds detected by the low energy data logger 12 with the maximum permitted wind speeds calculated by the controller 14 and triggers warnings, for instance via email, SMS, or push notifications on an output device 18 in danger situations. This decentral server 16 is familiar round the clock from the crane with the detected wind speed and the maximum permitted wind speed (or the respective speeds for the respective anemometers 10) in operation and also with the maximum permitted wind speed out of operation. The server 16 determines the status of the crane 1 (out of operation=switched off or in operation=switched on) and compares the detected wind speed having the corresponding last known maximum permitted wind speed. The information can be expanded, e.g., by additional data from corresponding meteorological weather services (e.g., external service 20) by additional known measured values (for instance, GPS position, height of the boom head above the ground, etc.) to warn the user of future weather situations.

A major part of the invention is the linking of the measured wind speeds with the limit values of the working machine 1 that are known to the controller 14 and the transmission of the data to an external server/cloud 16 at which, on the one hand, a storage of the data (current wind speed, working machine configuration, position or state and/or operating status of the working machine 1, permitted wind speed for a given position and configuration, location of the working machine 1, wind predictions corresponding to meteorological models, etc.) takes place and, on the other hand, warnings can be generated to the operator of the working machine 1 in real time on an approaching and/or exceeding of limit values. The warning can e.g. take place via an app using user management.

The wind data (e.g. of the last few minutes) are also transmitted to the external processing unit 16, for instance via GMS or another wireless technology, at settable time intervals outside the operation of the working machine 1. The anemometers 10 and the low energy data logger 12 detect the data completely independently of the remaining working machine 1. Only a power supply is required. A permanent recording and transmission of the data is thus made possible.

The crane is controlled by the crane controller 14 in ongoing operation. It detects data of different sensors 22 (and the wind speed of the anemometers 10) that in totality detect the crane configuration, crane position, GPS position, via a corresponding module 28, etc. The crane configuration is here for instance: how is the crane set up (main boom, needle boom), how long are the boom part pieces, at how many meters height are the respective anemometers 10, etc. The maximum permitted wind speeds or limit values for the different crane positions are calculated locally on the working machine 1 from these data: maximum permitted wind speed in the parked position, in the jack knife position, in the work position, but also in the switched off state. These data are likewise transmitted to the server 16 by means of telematics (e.g. a modem internal to the crane) 24. The data are transmitted at settable intervals that are comparable with but asynchronous to the transmissions of the data logger 12 or its associated transmission unit 24.

The incoming data are now analyzed on the external processing unit 16. Whether the crane 1 is switched on or in operation or whether it has been switched off can be determined on the basis of the transmission intervals of the data from the crane controller 14. A maximum wind speed can now be determined in dependence on the switched-on state of the crane 1 and on the geometrical data. The direct comparison of the wind data from the data logger 12 with these maximum permitted wind speeds now provides a very fast indication of the wind situation at the crane 1 and the current wind load. If now, for instance, the currently measured wind speed approaches the maximum permitted wind speed, a corresponding warning/alarm can be communicated to a user.

REFERENCE NUMERAL LIST 1 working machine (crawler crane)
2 superstructure
3 boom
4 needle boom
10 detection unit (anemometer)
11 signal generation means
12 recording unit
14 controller
16 external processing unit/server/cloud
18 output device
20 external service
22 sensor
24 transmission unit/telematics
26 memory/database
28 position detection unit (GPS module)

The invention claimed is:

1. A system for continuously monitoring wind influences on a working machine, comprising:
at least one anemometer that is arranged on the working machine and by means of which a current wind speed can be detected;
a recording unit that is adapted to receive, to store, and to transmit data of the at least one anemometer during and outside operation of the working machine, the recording unit powered by a recording unit energy source that is separate and independent from a working machine energy source configured to provide power to the working machine for operation of the working machine, the recording unit energy source and the recording unit configured so as to receive, to store, and to transmit data of the at least one anemometer both during operation of the working machine and when the working machine energy source is out of operation or turned off, and the recording unit energy source comprising a solar cell;
a controller of the working machine that is configured to determine a current working machine state, the current working machine state comprising at least a work position and whether in the work position a boom is within or outside a payload curve range, a parked position and whether in the parked position the boom is upright or is completely placed on a ground surface, and a jack knife position and whether in the jack knife position the boom is partially placed on the ground surface, and the controller configured to determine a current working machine configuration, the current working machine configuration comprising at least boom lengths used, whether the boom is with or without a needle boom/folding tip, and a height or position of the at least one anemometer that is arranged on the working machine;

an external processing unit that is configured to receive and to process data from the anemometer relating to the current wind speed and data from the controller directly or indirectly; and an output device that is configured to receive data from the external processing unit, wherein at least one of the controller or the external processing unit is/are configured to determine a limit value for a wind speed in dependence on the current working machine state and on the current working machine configuration;

wherein the output device is configured to, during and outside operation of the working machine, output a warning on at least one of a reaching or exceeding or impending reaching of the limit value by the current wind speed, and wherein during and outside operation of the working machine comprises both during operation of the working machine and when the working machine energy source is out of operation or turned off.

2. The system in accordance with claim 1, wherein an energy source is provided by means of which the recording unit is also suppliable with energy with a working machine out of operation.

3. The system in accordance with claim 1, wherein the output device is configured to graphically present data relating to at least one of a current wind speed or the limit value or to a weather forecast or to the current working machine state or to the current configuration of the working machine.

4. The system in accordance with claim 1, wherein the external processing unit is configured to determine with reference to a transmission interval of the data by the controller, that the working machine is out of operation and to continue to receive data from the recording unit relating to a current wind speed.

5. The system in accordance with claim 1, wherein the external processing unit is configured to compare the data received from the recording unit relating to the current wind speed and the data received by the controller relating to the limit value with one another, with the external processing unit further being configured to use a limit value last received by the controller in operation in a time period in which the working machine is out of operation for a comparison.

6. The system in accordance with claim 3, wherein the external processing unit is configured to receive data from the controller relating to at least one of the work position of the working machine or to the current working machine state or to the current working machine configuration or to payload values of the working machine or to limit values for wind speeds in dependence on the working machine state or to receive data from an external service relating to a weather forecast.

7. The system in accordance with claim 1, wherein at least one sensor is provided at the working machine by means of which a parameter of the current working machine state is detectable, with the controller being configured to receive data from the at least one sensor.

8. The system in accordance with claim 1, wherein at least one transmission unit is provided at the working machine and is configured to transmit data from at least one of the controller or from the recording unit wirelessly to the external processing unit.

9. The system in accordance with claim 1, wherein the controller is configured to receive the data from the at least one anemometer.

10. The system in accordance with claim 3, wherein data relating to the current configuration of at least one of the working machine or payload values or limit values for wind speeds in dependence on the working machine state or on the configuration of the working machine are stored in at least one of the controller or in a memory readable by the controller or by the external processing unit.

11. The system in accordance with claim 6, wherein a position detection unit arranged at the working machine for the detection of the current position of the working machine is provided, with the controller being configured to receive position related data from the position detection unit.

12. The system in accordance with claim 1, wherein the at least one anemometer is a rotatably supported cup anemometer.

13. The system in accordance with claim 1, wherein the at least one anemometer works without an energy supply and generates a signal, with the recording unit being configured to receive this signal.

14. A working machine comprising a system for monitoring wind influences on a working machine, having:

at least one anemometer that is arranged on the working machine and by means of which a current wind speed can be detected;

a recording unit that is adapted to receive, to store, and to transmit data of the at least one anemometer during and outside operation of the working machine, the recording unit powered by a recording unit energy source that is separate and independent from a working machine energy source configured to provide power to the working machine for operation of the working machine, the recording unit energy source and the recording unit configured so as to receive, to store, and to transmit data of the at least one anemometer both during operation of the working machine and when the working machine energy source is out of operation or turned off, and the recording unit energy source comprising a solar cell;

a controller of the working machine that is configured to determine a current working machine state, the current working machine state comprising at least a work position and whether in the work position a boom is within or outside a payload curve range, a parked position and whether in the parked position the boom is upright or is completely placed on a ground surface, and a jack knife position and whether in the jack knife position the boom is partially placed on the ground surface, and the controller configured to determine a current working machine configuration, the current working machine configuration comprising at least boom lengths used, whether the boom is with or without a needle boom/folding tip, and a height or position of the at least one anemometer that is arranged on the working machine;

an external processing unit that is configured to receive and to process data from the anemometer relating to the current wind speed and data from the controller directly or indirectly; and an output device that is configured to receive data from the external processing unit, wherein at least one of the controller or the external processing unit is/are configured to determine a limit value for a wind speed in dependence on the current working machine state and on the current working machine configuration;

wherein the output device is configured to, during and outside operation of the working machine, output a warning on at least one of a reaching or exceeding or impending reaching of the limit value by the current wind speed, and wherein during and outside operation of the working machine comprises both during operation of the working machine and when the working machine energy source is out of operation or turned off.

15. The system in accordance with claim 1, wherein the working machine is a mobile crane or a crawler crane with the recording unit arranged on the working machine, with the working machine comprising a battery of the working machine, and the recording unit energy source comprising a battery assigned to the recording unit that is separate from the battery of the working machine, and wherein the battery assigned to the recording unit is coupled with the solar cell.

16. The system in accordance with claim 9, wherein the controller presents data relating to at least one of the current wind speed or to the limit value on a display unit of the working machine.

17. The system in accordance with claim 11, wherein the position detection unit is a GPS module.

18. The system in accordance with claim 12, wherein the anemometer is arranged at a boom of the working machine.

19. The system in accordance with claim 13, wherein the at least one anemometer includes a reed switch.

* * * * *